April 14, 1959 — R. K. STRASEL — 2,881,847
TURF SLICER
Filed Dec. 30, 1955 — 2 Sheets-Sheet 1

INVENTOR:
RAYMOND K. STRASEL
BY: *Arthur J. Hansmann*
ATTORNEY

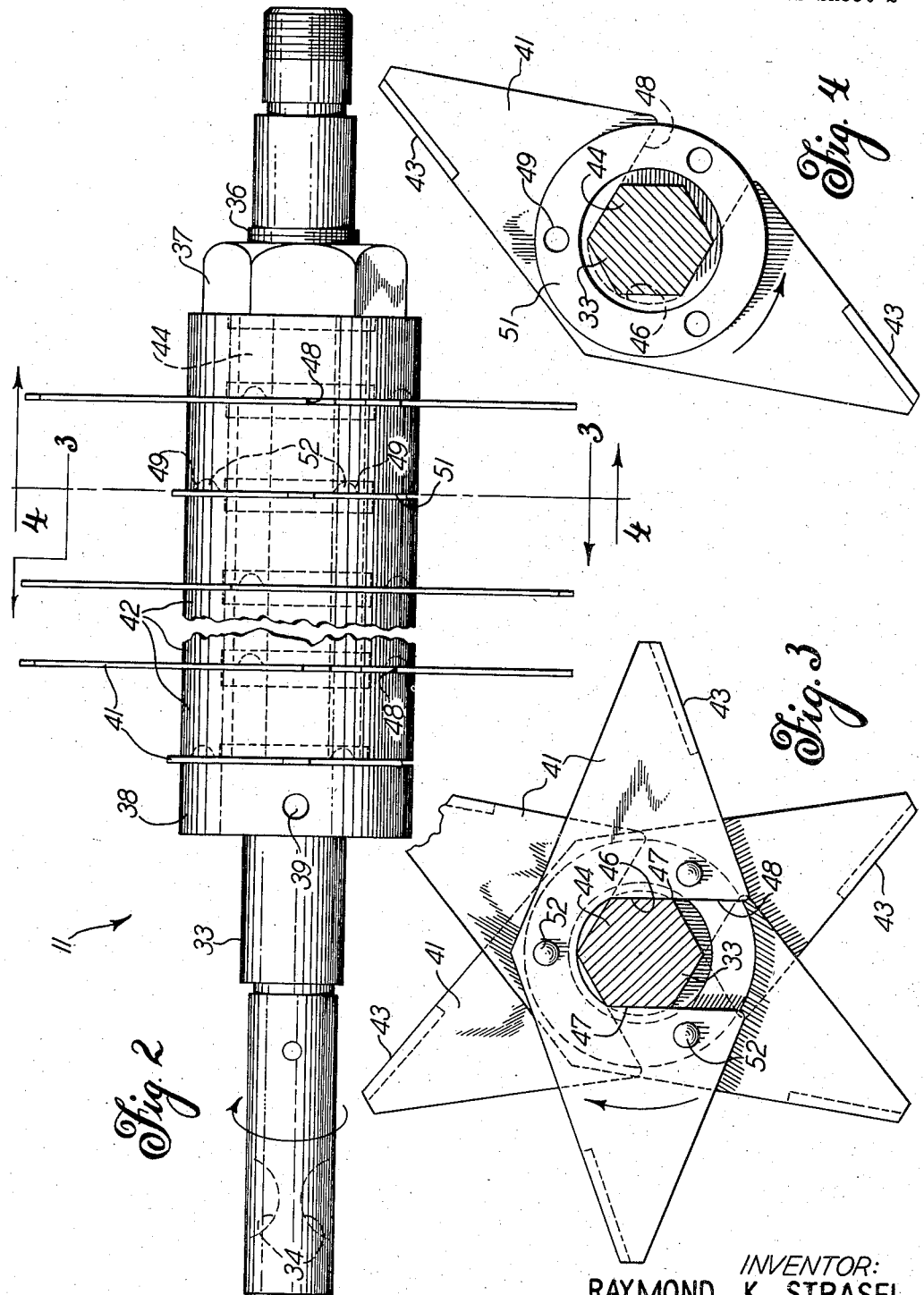

United States Patent Office 2,881,847
Patented Apr. 14, 1959

2,881,847

TURF SLICER

Raymond K. Strasel, Winthrop Harbor, Ill., assignor to Jacobsen Manufacturing Co., Racine, Wis., a corporation of Wisconsin Application December 30, 1955, Serial No. 556,591

3 Claims. (Cl. 172—549)

This invention relates to a turf slicer for use in operating over a lawn to slice the turf thereof.

Turf slicers are normally employed to provide thin slits in the top of the turf of the lawn for the purpose of conditioning the lawn. Particular application of a turf slicer is found in the employment of the slicer on creeping bent lawns, such as those used on golf course greens. Since a creeping bent lawn grows with the blades of grass horizontal rather than vertical, the blades, therefore, tend to mat over the turf and cut off the movement of air and moisture to the turf. A specific function of the slicer on the creeping bent lawn is the slicing of the lawn's runners which are disposed horizontally and extend for a length of a number of inches and, consequently, hamper the health of the surrounding lawn. These runners impede the growth of the adjacent lawn.

It is an object of this invention to provide a turf slicer having a plurality of slicing blades which can be independently and easily mounted and dismounted to and from the slicer unit without requiring the disassembly of any other part of the unit, and the latter is, therefore, inexpensive to maintain and manufacture.

It is another object of this invention to provide a turf slicer wherein each of the turf slicing blades is provided with two cutting edges disposed to alternately slice the turf during continuous operation of the slicer.

Still another object of this invention is to provide a turf slicer wherein the slicing blades are easily and readily mounted onto the supporting shaft in helically disposed positions.

Other objects and advantages will become apparent upon reading the following description in conjunction with the accompanying drawings, wherein:

Fig. 2 is an enlarged fragmentary rear view of the cutter sub-assembly shown in Fig. 1.

Fig. 3 is a sectional view taken substantially along the line 3—3 of Fig. 2 and with a tip of one blade broken away.

Figure 1:
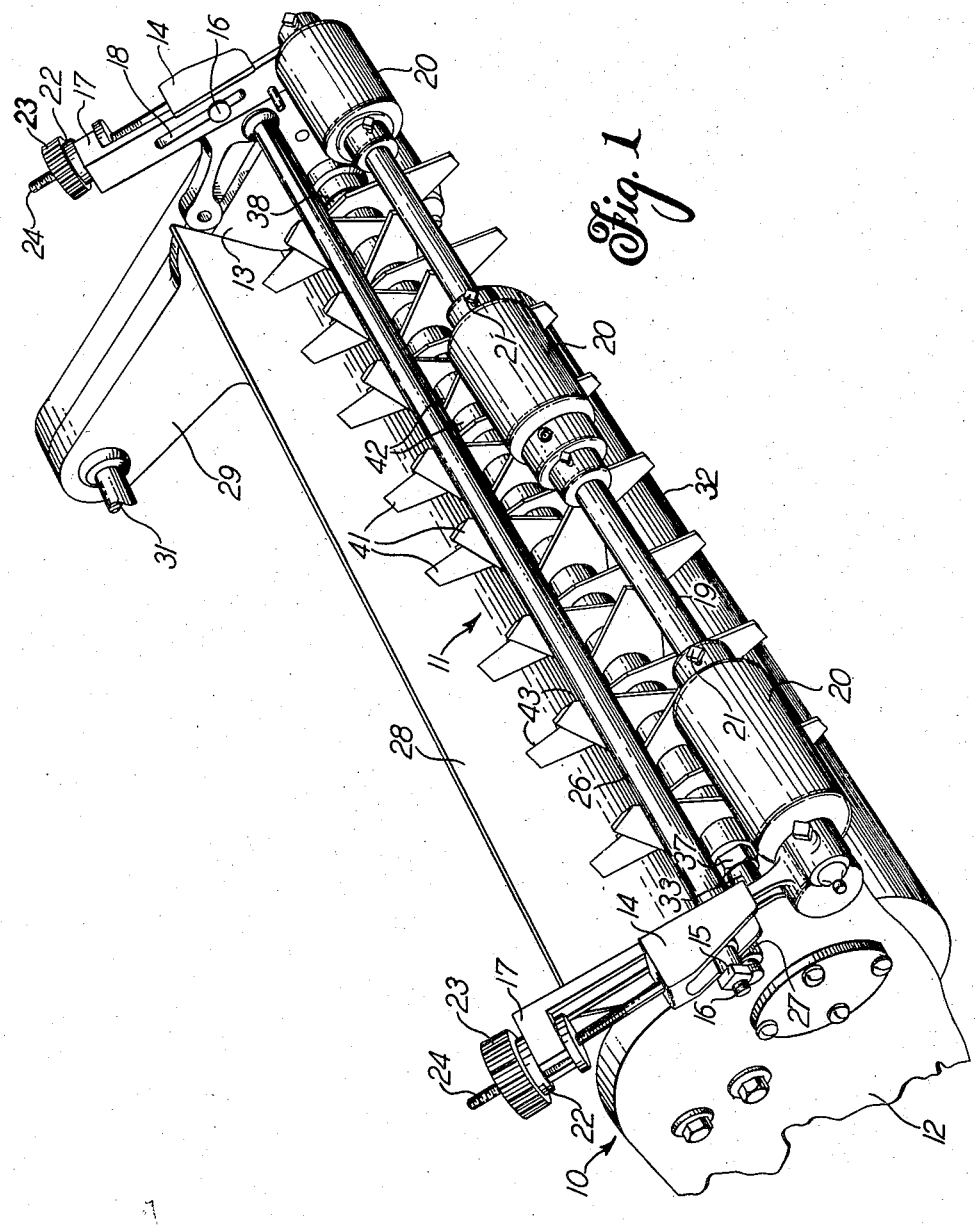
Fig. 1 is a fragmentary and front underneath perspective view of a preferred embodiment of this invention.

Fig. 4 is a sectional view taken substantially along the line 4—4 of Fig. 2, with section lines 3—3 and 4—4 being co-incident.

The same reference numerals refer to the same parts throughout the several views.

Fig. 1 shows a turf slicer including a fragment of a frame 10 which rotatably supports the cutter sub-assembly 11. It should be understood that the frame 10 can be attached to a suitable carriage for both mobilizing the frame and cutter unit and empowering the cutter unit during operation of the slicer. Therefore, the frame can be attached to a suitable carriage, such as that shown in or having the function of the carriage shown in U.S. Patent No. 2,244,099. Any suitable manner of supporting and propelling the implement, as shown in Fig. 1, is satisfactory within the purview of this invention. The frame 10 is shown to consist of side plates 12 and 13, each of which includes a block 14. Thus, vertical standards 17 are suitably slidably secured to the blocks 14 by means of nuts 15 and bolts 16, with the latter passing through slots 18 in the standards. The lower ends of the standards suitably support a shaft 19 extended between the standards and having a plurality of ground engaging rollers 20 rotatably mounted on the shaft with set screws 21 maintaining the spacers shown on each side of the rollers. Thus, the rollers 20 engage the ground in front of the cutter unit 11 and roll over the ground as the turf slicer advances. The upper ends of the standards 17 are preferably shaped as shown to each engage a spool-shaped thrust collar 22 which integrally includes a knurled nut 23. Each combined collar and nut threadedly engages a stud 24 anchored at its lower end in each of the blocks 14. With this arrangement, loosening of the nuts 15 and threadedly adjusting the nuts 23 on the stationary studs 24 will permit vertical adjustment of the forward rollers 20 and thus, correspondingly, raise or lower the cutter unit 11 with respect to the ground.

Also included in the frame 10 is a support bar 26 suitably attached, by means of nuts 27, to the opposite sides of the frame plates 12 and 13. Further, a grass and debris deflector 28 is suitably attached between the plates 12 and 13 for the well-known purpose of causing the cut grass to be directed forwardly of the entire unit. The deflector 28 is particularly useful when the frame 10 and the carriage supporting the same are propelling a lawn mower reel which can be substituted for the cutter unit 11 when it is desired to use the machine as a lawn mower. A drive transmission housing 29 is also attached to the frame 10 to support a driving shaft 31 from which driving power is transmitted through the drive chain or belt (not shown) disposed within the housing 29 and drivingly attached to the adjacent end of the cutter unit 11, all in any well-known manner. Also, a rear roller 32 is rotatably mounted in the frame 10 to roll over the ground as the machine advances during operation.

Since that part of Fig. 1 which deals with the frame 10 is of any well-known construction, no further showing or description thereof is deemed to be necessary, and Figs. 2, 3, and 4 clearly show the invention so that one skilled in the art can understand the teachings of this application. Therefore, no further general description of this unit is deemed to be necessary.

Referring to Figs. 2, 3, and 4, in addition to Fig. 1, it will be noted that the sub-assembly or cutter unit 11 includes a shaft 33 with conventional keyways 34 provided in the shaft end which is rotatably supported by the side plate 13. Thus, the keyways 34 provide a rotational drive connection through a sprocket or pulley (not shown) mounted over the keyway portion of the shaft 33 to engage the chain or belt previously mentioned as being disposed within the housing 29. The opposite end of the shaft is threaded at 36 to receive a lock nut 37 which is, therefore, available to force against a stop collar 38 axially fixed to the other end of the shaft by a pin 39 in any well-known manner. Between the nut 37 and the collar 38, a plurality of alternately disposed cutting blades 41 and spacers 42 are non-rotatably mounted on the shaft 33. The latter is, of course, rotatable in a forward direction of advance of the entire machine with that direction of rotation being as shown in Figs. 2, 3, and 4. It should also be noted that the blades 41 are mounted on the shaft 33 in a helical pattern with each blade being positioned sixty degrees out of alignment with the adjacent blade. The blades 41 are elongated, and each blade is provided with two cutting or slicing edges 43 which are oppositely disposed with the edges in a rotatably leading position when the unit 11 is normally rotated during the use of the unit.

Particularly Figs. 3 and 4 disclose that the shaft 33 is formed through its intermediate portion 44 in an angularly shaped or hexagonal cross section. Also, those drawings show that the blades 41 are each provided with a central opening 46 which is defined by diametrically opposite and parallel segments 47 of the blades 41. The opening 46 is thus shaped to snugly receive the opposite parallel and flat faces of the hexagonally shaped shaft portion 44, and the blades are thus non-rotatably mounted or keyed to the shaft 33. Each blade is also provided with an opening 48 which extends through one side edge of the blade and into the central opening 46 of the blade. The opening 48 is, therefore, aligned with the opening 46, and the sides defining the opening 48 are continuations of the segments 47 of the blades 41. It should be understood that all of the blades 41 are formed as described, and, therefore, each blade can be mounted and dismounted onto and off the shaft portion 44 by moving the blade transverse to the axis of the shaft. Thus, the blades are merely slipped over the shaft with each blade mounted separately or independently of the other blades since the other blades need not be removed or even substantially displaced with respect to the shaft 33 to permit any one of the blades to be mounted or dismounted.

As previously mentioned, a spacer 42 is disposed between every two adjacent blades 41 and, as shown in Figs. 3 and 4, the interior of each spacer is shown to be hexagonally formed to snugly receive the hexagonal portion 44 of the shaft 33. Also, each spacer 42 is shown provided with a plurality of cavities or recesses 49 which are preferably equally spaced in position around the spacers and on one face 51 of the spacer. In assemblying the blades and the spacers onto the shaft portion 44, the blades are positioned as described while the spacers are placed with each succeeding spacer rotated sixty degrees from the position of the recesses 49 of the previous spacer. This relation is, therefore, as shown in Fig. 2. The blades 41 are each provided with protrusions 52 which are formed and disposed to be received within the corresponding recesses 49 of the adjacent spacer 42. The mating of the protrusions 52 of the blades 41 with the recesses 49 of the spacers 42 causes the blades and spacers to be locked together to rotate in unison, and the protrusions 52 and recesses 49 thus form a rotational drive between the blades and the spacers. After the spacers have been positioned on the shaft at sixty degree intervals, the blades are automatically aligned at their sixty degree intervals by virtue of the protrusions 52 engaging the recesses 49. Thus, both the openings 48 and 46 in the blades 41, as well as the alignment of the protrusions 52 and recesses 49, assure the desired positioning of the blades in their helical pattern on the shaft 33.

It will thus be obvious that if it is desired to remove any one of the blades 41 from the shaft portion 44, mere loosening of the nut 37 will permit the spacer 42, which is adjacent the blade that is to be removed, to be shifted to disengage the protrusions 52 of the blade with the recesses 49 of the spacer, and the blade is then free to be moved transverse to the shaft without requiring any other part to be removed from the shaft. It should be understood that the blades employed in a turf slicer are necessarily extremely thin blades, being of a thickness of perhaps 1/32 of an inch, and, therefore, the arrangement of the protrusions 52 within the spacers 49 provides stability for the transmission of rotation between the shaft 33 and the blades 41.

While a specific embodiment of this invention has been shown and described, it should be obvious that certain changes could be made, and this invention should, therefore, be limited only by the scope of the appended claims.

I claim:

1. A cutter sub-assembly for a turf slicer, comprising a shaft including a hexagonally shaped cross-sectional intermediate portion, a plurality of linearly elongated and flat and thin blades mounted on said portion of said shaft to be non-rotatable thereon with the central portions of said blades having opening for receiving said shaft and with the two ends of each of said blades projecting on diametrically opposite sides of said shaft, said blades including sharpened edges on said ends thereof and having openings in the portions of said blades intermediate said ends thereof for individually assembling and disassembling said blades on said shaft by moving said blades transverse to said shaft, a plurality of spacers each having a hexagonal opening of the size of said hexagonally shaped portion of said shaft for snugly receiving said portion and with said spacers disposed alternately and juxtaposed with said blades on said shaft for locking said blades and said spacers in non-rotatable relation on said shaft, means on said shaft for forcing axially thereof against said blades and said spacers, said blades and said spacers both including three equally circularly spaced interengaging portions on the juxtaposed sides thereof for non-rotatably locking said blades and said spacers together with respect to said shaft and for rotationally orienting said blades on said shaft.

2. A turf slicer comprising a frame adapted to be movable on the ground, a shaft rotatably disposed in said frame to be parallel to the ground when said turf slicer is in operating position, the intermediate portion of said shaft being hexagonal in cross-section, a plurality of flat and thin turf slicing blades transversely mounted on said intermediate portion of said shaft with each of said blades having a centrally located opening extending from an edge of each of said blades to the center thereof for mounting said blades on said intermediate portion of said shaft by moving said blades transverse to said shaft, and with the edges of said blades defining said opening being parallel and juxtaposed to opposite sides of said hexagonal cross-section of said shaft, said opening being formed to snugly receive said intermediate portion of said shaft for non-rotatably mounting each of said blades on said shaft, said blades having diagonally opposite and tapered end portions with said end portions being symmetrical about the center line therethrough and along the length of said blades, a plurality of spacers mounted on said shaft with said spacers alternately disposed with said blades and having hexagonal openings for snugly mounting on said hexagonal cross-section of said shaft, and three pair of equally circularly spaced interengaging means on said blades and said spacers for non-rotatably securing the latter two together, stop means on one end of said shaft, and a nut on the other end of said shaft for forcing said blades and said spacers together in interengaged non-rotatable relation.

3. A turf slicer comprising a frame adapted to be moved on the ground, a shaft rotatably mounted on said frame to be horizontally disposed when said frame is in a movable position on the ground, said shaft including an intermediate portion of a polygonal cross-sectional shape, a plurality of linearly elongated and flat and thin turf slicing blades mounted on said intermediate portion of said shaft and disposed transverse to the axis of the latter and having diameterically opposite ends extending from said shaft a distance sufficient to slice the ground upon rotation of said shaft, the extending ends of said blades having sharp edges only on their rotationally leading edges, a plurality of spacers mounted on said shaft and having interiors of said cross-sectional shape to be non-rotatably mounted on said shaft and alternately disposed with said blades, each of said blades having an opening extending from one edge thereof to the center of said blade and being partly of said polygonal cross-sectional shape to snugly and non-rotatably receive said intermediate portion of said shaft and for moving the latter onto and off said intermediate portion of said shaft by movement in a direction transverse to the latter, said openings being located to mount said blades on said shaft with said sharp edges in rotationally leading positions, interengaging means on said blades and said spacers equally circularly spaced thereon for non-rotatably securing them together on said shaft, stop means on one end of said shaft, and a nut on the other end of said shaft for forcing said blades and said spacers together in interengaged non-rotatable relation.

References Cited in the file of this patent

UNITED STATES PATENTS

| | | |
|---|---|---|
| 949,218 | Christoffersen | Feb. 15, 1910 |
| 1,416,906 | Strom et al. | May 23, 1922 |
| 2,149,193 | Stock | Feb. 28, 1939 |
| 2,244,099 | Chase | June 3, 1941 |
| 2,551,049 | Pinkers | May 1, 1951 |

FOREIGN PATENTS

| | | |
|---|---|---|
| 164,975 | Austria | Jan. 10, 1950 |